United States Patent [19]

James et al.

[11] 4,190,961

[45] Mar. 4, 1980

[54] METHOD AND APPARATUS FOR ALIGNING TURBINE INTERNAL COMPONENTS

[75] Inventors: Reginald S. James, Winchendon; Thomas M. Grier; Robert D. Schmidt, both of Fitchburg, all of Mass.

[73] Assignee: General Electric Company, Schenectady, N.Y.

[21] Appl. No.: 933,176

[22] Filed: Aug. 14, 1978

[51] Int. Cl.² .............................................. G01B 7/30
[52] U.S. Cl. ............................... 33/180 R; 33/169 C; 33/286
[58] Field of Search ............. 33/180 R, 181 R, 174 Q, 33/178 E, 178 R, 174 L, 286, 169 C; 415/219

[56] References Cited

U.S. PATENT DOCUMENTS 3,426,437   2/1969   Rebhun et al. .................... 33/174 Q Primary Examiner—Willis Little
Attorney, Agent, or Firm—John F. Ahern; Ormand R. Austin; James W. Mitchell

[57] ABSTRACT

A method is presented for aligning internal turbine components, such as a packing ring holder, a rotor during assembly of the turbine. The method includes the step of inserting a plurality of proximity probes into a gap between the rotor and the packing ring holder. Thereafter, the packing ring holder is adjusted until the readouts from all probes are the same. In order to practice the method, a tool has been devised for inserting the proximity probes into the gap. The tool comprises a semi-rigid metal strip upon which the probes are spaced and mounted and further includes means for biasing the probe away from the rotor surface.

7 Claims, 3 Drawing Figures

DIAPHRAGM (12)

METHOD AND APPARATUS FOR ALIGNING TURBINE INTERNAL COMPONENTS

BACKGROUND OF THE INVENTION

This invention generally relates to measuring and alignment procedures and, in particular, relates to internal component alignment within a turbomachine casing.

A turbine casing for a large turbomachine is usually split along a horizontal joint to form casing halves; an upper casing half and a lower casing half. Within the turbine casing there are certain stationary internal components which minimize the axial flow of motive fluid such as packing rings, diaphragms, and other annular surfaces about the rotor surface. Generically, these devices may be referred to as packing ring holders. During the assembly of the turbine a packing ring holder half is positioned into each casing half. Thereafter a rotor is positioned into the lower casing half. One aspect of the present invention deals with aligning the packing ring holder with the surface of the turbine rotor. There is a radial clearance between the rotor surface and the packing ring holder inner circumference which extends along the length of the holder inner circumference. It is important that the rotor be exactly positioned within the lower packing ring holder half. Thereafter the upper casing half is lowered onto the lower casing half and bolted into place.

The radial annular clearance between a rotor surface and an annular packing ring is necessarily very limited to prevent excessive axial leakage of motive fluid and consequent decrease in machine efficiency. This clearance may be expressed in terms of mils. If the clearance is too great there is an increase in axial steam leakage. If the clearance is too slight then there is a chance that a shaft rub could cause damage to either the shaft or a packing ring which terminates the inner circumference of a packing holder. This means that extraordinary care must be taken in order to properly position the rotor relative to the surrounding annular packing ring holder. Relatively simple measurement devices such as mechanical gauges or shims have been utilized as well as sophisticated electronic or telemetric methods. The present invention is a relativey simple yet accurate method of positioning a turbine rotor within a turbine casing.

In carrying out the method of the present invention, means had to be devised for measuring the requisite radial clearance in a relatively restricted area. Means have been invented for inserting a plurality of space proximity probes between the rotor surface and the packing holder inner circumference for measuring the radial clearance therebetween at certain predetermined locations around the rotor surface. The packing holder is adjusted until the rotor surface is equally distant from the measuring probes. Adjustment means for altering the packing holder position are illustrated; for example, in U.S. Pat. No. 3,861,827 to Peabody et al. It is desirable that the method and apparatus of the invention be available for both factory and field installation.

OBJECTS OF THE INVENTION

It is one object of the present invention to provide a simple and accurate method for positioning a packing ring holder relative to a turbine rotor in a turbine casing.

It is another object of the invention to provide a tool for positioning a packing holder relative to a turbine rotor which tool is available for both field and factory practice.

It is another object of the invention to provide a method and apparatus for positioning a turbine rotor within a turbine casing which is not susceptible to human error found in taking mechanical measurements.

Other objects, advantages and features of the present invention will become apparent from the following description of a preferred embodiment thereof when read in connection with the accompanying drawings.

BRIEF DESCRIPTION OF THE INVENTION

The invention comprises a method and apparatus for positioning a packing ring holder or other annular surface relative to a rotor within a turbine casing. The method comprises equalizing the radial distance between the rotor surface and the lower half packing ring holder. This is accomplished by utilizing proximity probes in a unique manner to measure the aforesaid radial distance. The invention also comprises a special tool used to carry out the method comprising at least one piece of metal stock to which is attached spaced proximity probes for carrying out the required measurements. Means are further provided for biasing each proximity probe away from the rotor surface. In utilizing the proximity probes the present invention has obviated one possible human error inherent in the use of mechanical contact measuring devices.

DETAILED DESCRIPTION OF THE INVENTION

A turbomachine includes a fluid tight outer casing having therein stationary and rotating parts which define an axial flow path for motive fluid. The rotating parts include a turbine rotor having turbine blades which extend radially outward from the rotor. The stationary parts include turbine nozzles which direct the motive fluid efficiently into the turbine blades. The nozzles are part of a large turbine part called a diaphragm which is an annular structure the inner circumference of which terminates in a shaft packing. The shaft packing is a seal adjacent the rotor surface which prevents the axial leakage of steam along the rotor shaft. The more efficient the shaft seal, the more steam passing through the blades and the higher the turbine efficiency. Other packing ring arrangements include shaft packings at each end of the turbine. Packing holder is used generically to describe annular seal constructions about a turbine rotor.

A large industrial turbine is constructed in upper and lower halves split along a horizontal joint. A lower packing holder half is inserted into the lower casing half and then the turbine rotor is positioned into the lower casing. Once the packing holder is aligned with the rotor then the packing seal may be inserted into the radial clearance between the diaphragm and the rotor.

Thereafter the upper casing half and the upper packing holder half is assembled to the lower casing half the two casing halves being bolted together.

Figure 1:
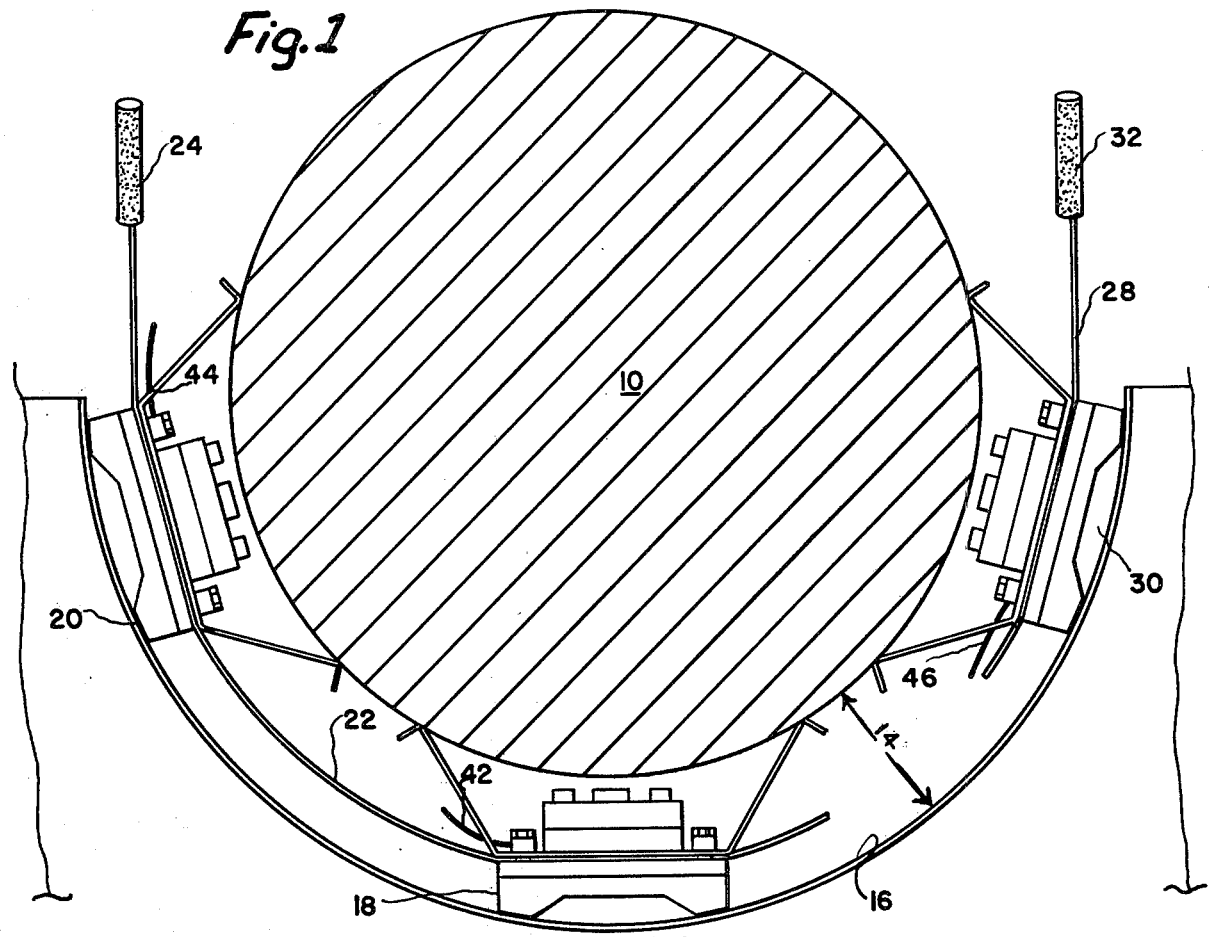
FIG. 1 is an axial end view of a turbine shaft positioned adjacent a packing ring holder and showing further the present invention incorporated therein in a working position.

FIG. 1 is a representation of a shaft or rotor 10 which is supported within a turbine casing (not shown) which casing also supports a lower packing holder half 12. The packing ring teeth have been removed from the packing holder. A large radial gap 14 is indicated between the rotor surface and the inner circumference 16 of the packing holder. No attempt has been made to show other turbine parts either rotating or stationary because they are well known in the art and not particularly germane to the present invention. It should be sufficient to note that one requirement of proper assembly of a turbine rotor in a turbine casing is that the rotor surface be equally distant from the inner circumference of the packing holder. Otherwise expressed, the rotor must be as nearly concentric within the turbine packing holder as can be arranged.

The method of the present invention comprises the step of inserting a plurality of test probes in the gap between the rotor surface and the inner circumference of the packing holder. In a preferred embodiment of the invention there are three such probes. A bottom probe 18 and a side probe 20 are each mounted on a first length of metal stock 22 inserted into the gap 14 from one side of the turbine casing. A handle 24 may be formed or attached to the end of the metal stock 22. A second length of metal stock 28 includes a second or other side probe 30 and is also formed with a handle 32. This probe is inserted from the opposite side of the turbine into the gap between the rotor and packing holder.

Figure 2:
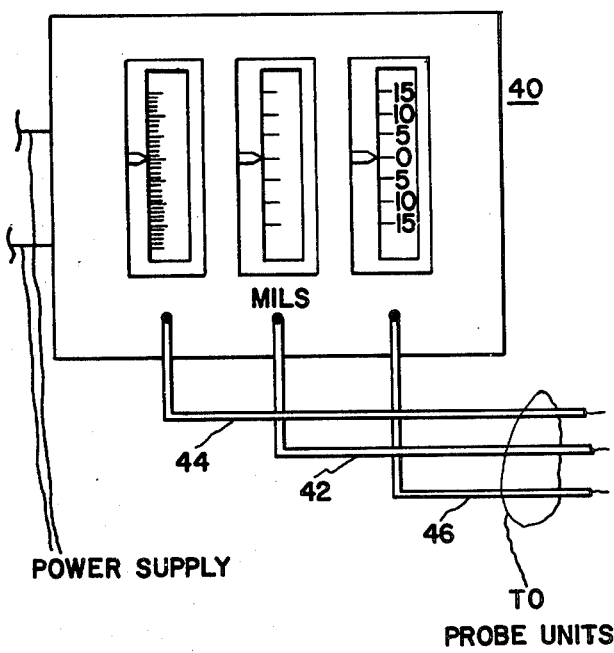
FIG. 2 is a diagrammatic representation of a readout device employed in combination with the present invention.

Referring to FIGS. 1 and 2 in combination, each of the three probes is connected to an electronic readout device 40. Probe 18 is connected to the device through lead 42; probe 20 is connected to the lead 44 and to the device and probe 30 is connected to the readout through line 46. Each probe is a non-contact eddy probe which operates on inductive proximity principals. The electronic readout device 40 gives a displacement measurement in Mils. The entire probe itself, power supply and readout system may be obtained from the Bently Nevada Corporation of Minden, Nev. under the description of a Proximity Measuring System, 3000 Series; or, the Dymal Company, a Division of Spectral Dynamics Corporation, San Diego, Cal.

Figure 3:
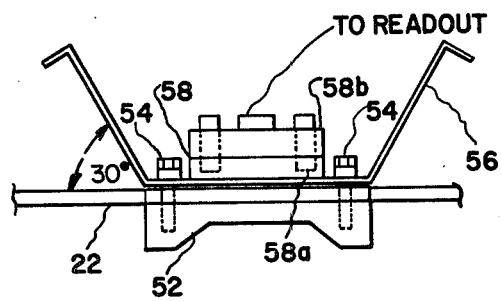
FIG. 3 is an enlarged elevation view of a single probe module attached to a piece of metal stock.

FIG. 3 in combination with FIG. 1 shows the mounting apparatus for the probe itself. The metal stock 22 is a semi-rigid piece of metal strip which may be easily snaked into the gap between the rotor surface and the inner circumference of the packing holder. A base 52 is mounted to the metal stock by means of screws 54. The screws also retain biasing means 56 to the metal stock. The biasing means prevent contact between the probe tip and the rotor surface as well as firmly positioning the base against the packing holder surface while allowing limited movement of the rotor for adjustments. The biasing means is a piece of metal stock which may be bent at an angle of perhaps 30° from the horizontal.

The probe holder 58 may be welded to the biasing means and base or attached in any suitable fashion. The holder may include a holder 58A and cover 58B which are attached together by screws after the probe is inserted into the holder.

The present invention comprises the afore-described device and a method for aligning turbine internal components which is practiced with the following steps.

After the lower packing housing half has been assembled into the lower casing half, the rotor is mounted and approximately positioned in the lower casing half so that a radial gap is defined between the rotor and the annular surface around a portion of the rotor circumference which annular surface may be the inner circumference of the packing holder ring. The apparatus of the present invention comprising the plurality of test probes assembled on a semi-rigid piece of flat metal stock must be calibrated. The step of calibrating the test probes may be carried out by inserting each test probe into the radial gap and zeroing the readout from the probe. Hence, the meters for each of the probes are calibrated equal from a common datum. Once the test probes are all calibrated they are inserted into the radial gap for measuring the distance between the probe tip and the rotor surface. Since the apparatus is specially constructed with a biasing means to hold the non-contact probe away from the rotor surface the distance between the probe tip and the rotor surface may be measured. The base portion of the tool bares against the annular surface of the lower packing holder half and hence, the alignment tool is held in a relatively stationary position. Measurements are taken at two opposite side locations and one bottom location for aligning the rotor. The rotor is aligned whenever the three meters on the readout device are all at the same level. Alignment is obtained by adjusting the packing holder position relative to the rotor surface.

While there has been shown what is considered to be the preferred embodiment of the present invention other modifications may occur to those skilled in the art. It is intended to cover in the appended claims all such modifications as fall within the true spirit and scope of the invention.

What is claimed is:

1. A method of aligning a turbine rotor within a turbine casing relative to an annular surface comprising the steps of:
   mounting the rotor in the lower casing half whereby a radial gap is defined between the rotor and the annular surface around a portion of the rotor circumference;
   calibrating a plurality of test probes in order to obtain a common datum;
   inserting said calibrated test probes into the radial gap around the circumference of the rotor for measuring the radial distance from each test probe to the rotor surface; and,
   adjusting the position of the annular surface so that the radial distances between each test probe and the rotor surface are the same.

2. The method recited in claim 1 further comprising the steps of:
   assembling the test probes onto a semi-rigid piece of flat metal stock; and,
   inserting said flat metal stock into said radial gap for accurate positioning of said test probes in the circumferential direction.

3. The method recited in claim 1 further comprising the steps of:
   assembling the test probes onto a semi-rigid piece of flat metal stock;
   providing a biasing means in the vacinity of each assembled test probe on said metal stock; and,
   inserting said flat metal stock into the radial gap so that the biasing means determines the radial position of said test probe relative to the rotor and the annular surface.

4. A device for aligning a turbine rotor relative to an annular packing housing comprising:
- a length of flat metal stock;
- at least two test probes mounted on said length of metal stock;
- biasing means mounted on the metal stock in the vacinity of each test probe whereby each test probe may be circumferentially and radially positioned in a remote location between the rotor and annular packing housing.

5. The device recited in claim 4 further comprising:
- a machined base positioned at each probe location on the length of metal stock;
- a holder for removably retaining said probe on said metal stock;
- a cover for retaining said probe in said probe holder.

6. The device recited in claim 4 further comprising:
- a first length of metal stock having at least two probes mounted thereon;
- a second length of metal stock having at least one test probe mounted thereon whereby the first length of metal stock may be inserted from one side of the rotor between the rotor and packing housing to position test probes at the bottom and side of the turbine rotor; and, said second length of metal stock may be inserted between the rotor and packing housing from the other side of the rotor to position a test probe opposite the first side test probe.

7. A method for aligning a semi-annular packing holder in a turbine casing relative to a turbine rotor comprising the steps of:
- assembling said rotor and packing housing into said turbine casing in rough alignment such that a radial arcuate gap is defined between the rotor surface and the semi-annular holder;
- providing a measuring device comprising at least three proximity probes mounted on flat metal stock for insertion into said gap;
- calibrating the proximity probes to a common datum;
- inserting said proximity probes into the gap so that measurements are taken at the bottom and each side of the rotor; and,
- aligning the packing housing until each proximity probe produces substantially the same readout.

* * * * *